(12) United States Patent
Matsui

(10) Patent No.: US 7,678,326 B2
(45) Date of Patent: Mar. 16, 2010

(54) METHOD AND APPARATUS FOR MANUFACTURING FINE PARTICLES

(75) Inventor: Isao Matsui, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 11/767,886

(22) Filed: Jun. 25, 2007

(65) Prior Publication Data
US 2007/0246868 A1    Oct. 25, 2007

Related U.S. Application Data

(62) Division of application No. 10/242,634, filed on Sep. 13, 2002, now Pat. No. 7,297,323.

(30) Foreign Application Priority Data
Sep. 25, 2001    (JP) .............................. 2001-292279

(51) Int. Cl.
*B22F 9/16*    (2006.01)
*B22F 9/22*    (2006.01)
*B22F 1/00*    (2006.01)

(52) U.S. Cl. .................. 266/140; 266/138; 266/144; 266/157; 266/251; 266/252; 75/623; 75/626; 75/228; 75/245

(58) Field of Classification Search ............... 266/138, 266/140, 144, 157, 251, 252; 75/228, 245, 75/623, 626
See application file for complete search history.

(56) References Cited

U.S. PATENT DOCUMENTS 3,640,745 A    2/1972    Darr et al.
4,022,872 A    5/1977    Carson et al.
4,266,977 A *  5/1981    Steiger ..................... 501/87
4,404,076 A *  9/1983    Nakagawa et al. .......... 427/578
5,508,015 A    4/1996    Gonzales et al.

FOREIGN PATENT DOCUMENTS

| JP | 59-107905 | 6/1984 |
| JP | 62-79536 | 5/1987 |
| JP | 63-085007 | * 4/1988 |
| JP | 63-118941 | 8/1988 |
| JP | 63-319045 | 12/1988 |
| JP | 10-015380 | 1/1998 |

* cited by examiner

*Primary Examiner*—Roy King
*Assistant Examiner*—Lois Zheng
(74) *Attorney, Agent, or Firm*—Oblon, Spivak, McClelland, Maier & Neustadt, L.L.P.

(57) ABSTRACT

An apparatus for manufacturing fine particles includes a reactor; a first inlet part including at least one port introducing a reactive gas flow containing a fine particle source material; a second inlet part including at least one port introducing a diluting gas flow; a heater exciting the fine particle source material in the reactive gas flow; a first plate including through-holes which substantially equalize a flow rate of the reactive gas flow with respect to a cross section of a flow channel; a second plate including through-holes which substantially equalize a flow rate of the diluting gas flow with respect to a cross section of a flow channel; a gas exhaust port provided in a merging region where the reactive gas flow passed through the first plate and the diluting gas flow passed through the second plate are merged; and a collector which collects fine particles.

8 Claims, 10 Drawing Sheets

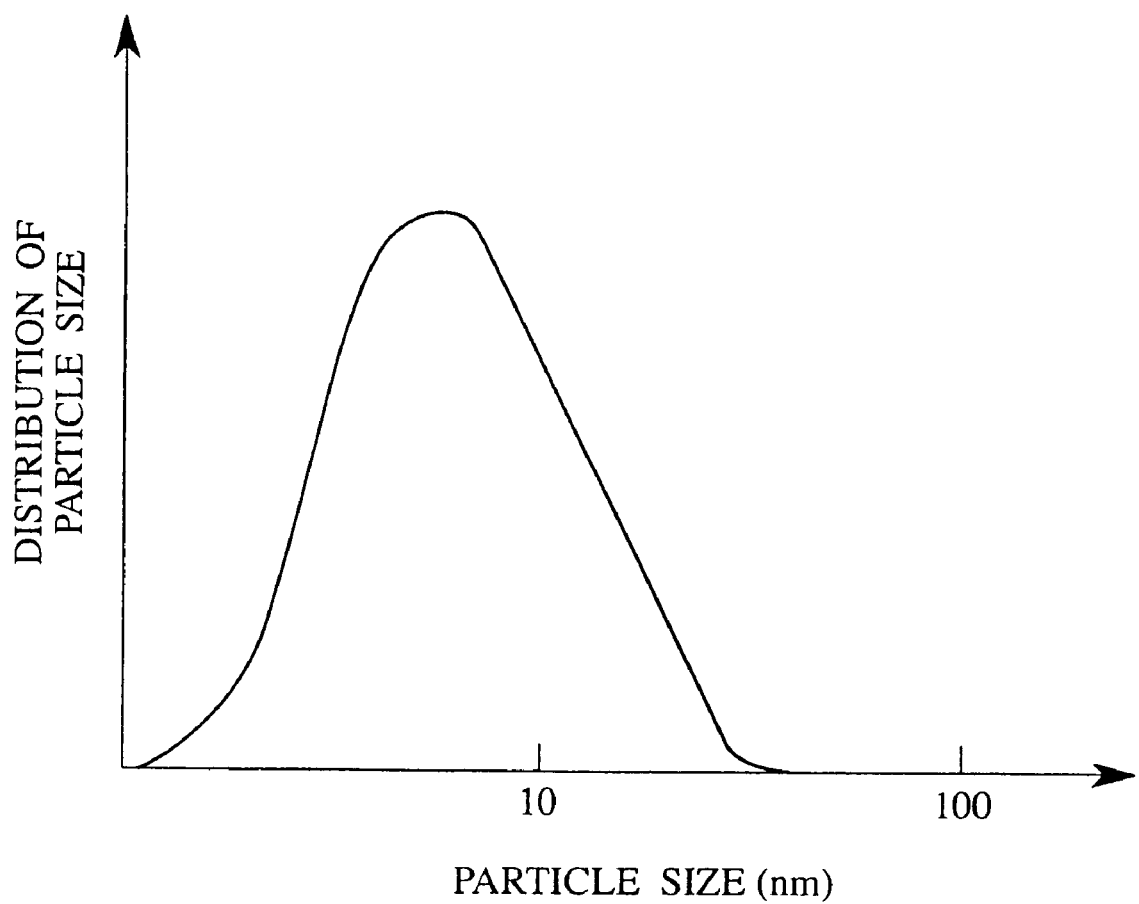

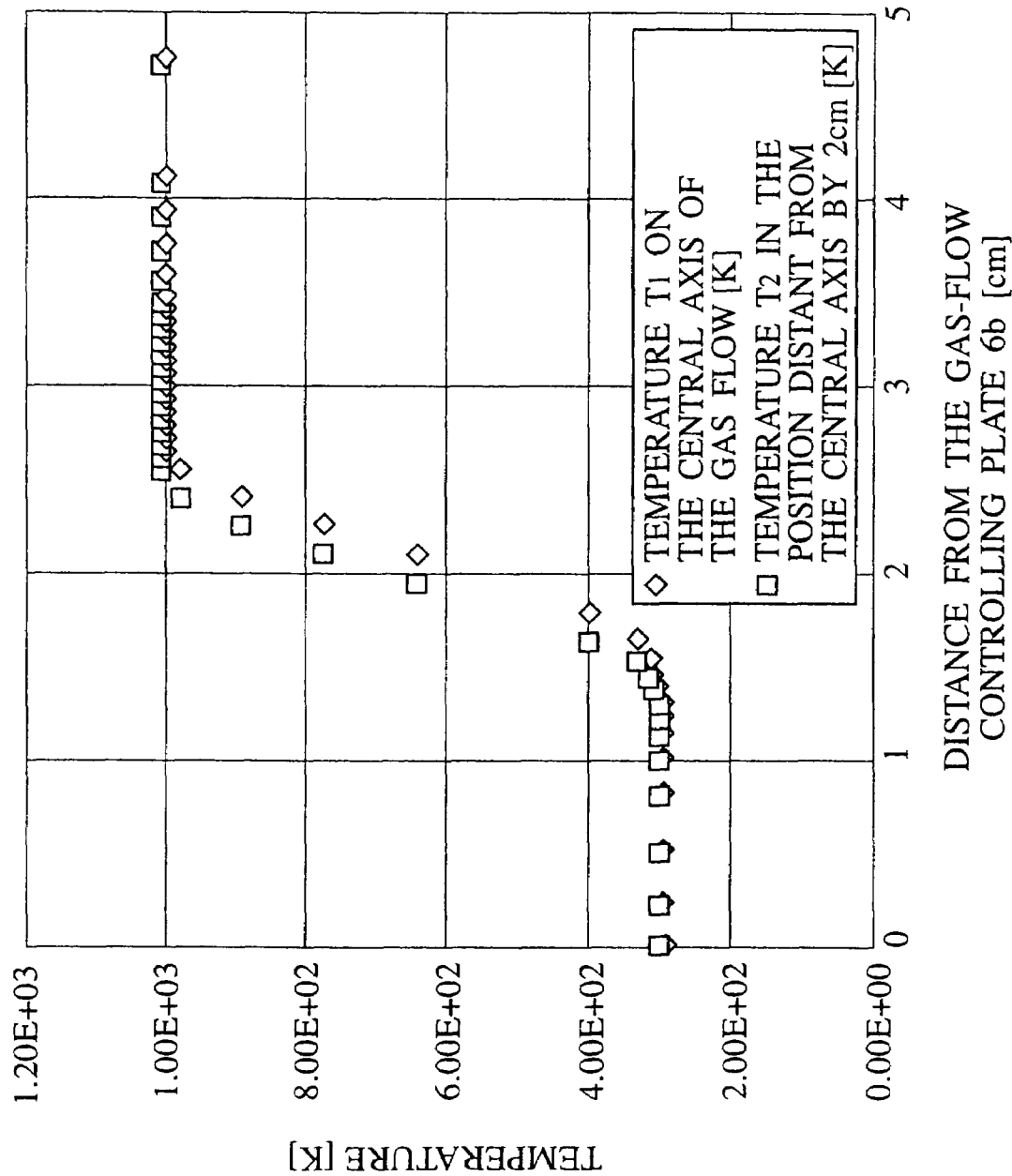

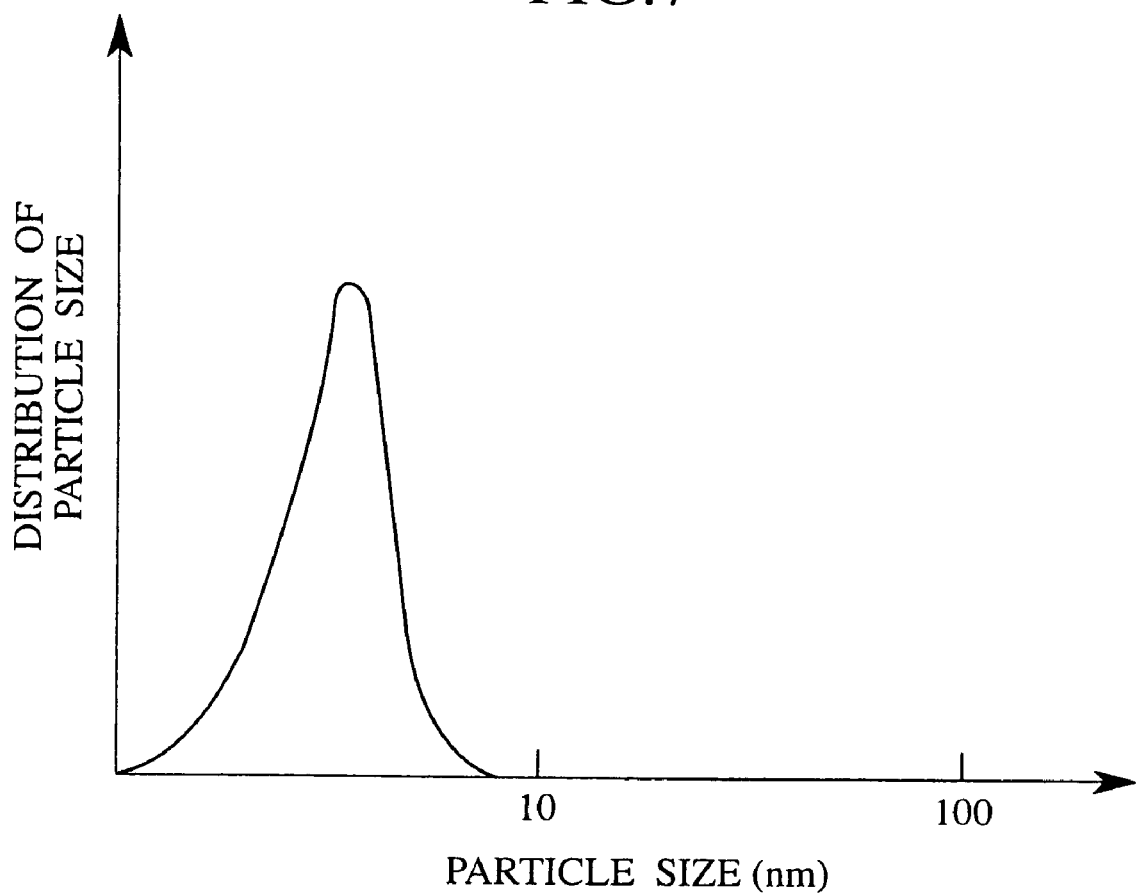

METHOD AND APPARATUS FOR MANUFACTURING FINE PARTICLES

CROSS REFERENCE TO RELATED APPLICATION

The present divisional application claims the benefit of priority under 35 U.S.C. §120 to application Ser. No. 10/242,634, filed on Sep. 13, 2002, and under 35 U.S.C. §119 from Japanese Patent Application No. 2001-292279 filed on Sep. 25, 2001, the entire contents of both are incorporated herein by reference.

BACKGROUND OF THE INVENTION

1. Field of the Invention

The present invention relates to methods for manufacturing fine particles and to apparatuses for manufacturing fine particles. More specifically, the present invention relates to a vapor-phase growth method for fine particles in nanometer sizes and to a manufacturing method thereof.

2. Description of the Related Art

Fine particles in nanometer sizes exert unprecedented functions due to a quantum size effect. Accordingly, fine particles are recently drawing attention as new substances. Depending on types of materials, such fine particles are applied to fluorescent materials for visible light LED elements and displays, magnetic recording media and the like.

In general, fine particles are fabricated by use of a vapor-phase growth method. FIG. 1 is a view showing a constitution of a conventional apparatus for manufacturing fine particles. For example, ZnS fine particles being fluorescent materials are manufactured in accordance with the following method by use of the apparatus shown in FIG. 1 (Okuyama et al. J. Materials Science, vol. 32, 1229-1237 (1997)).

Source gas containing $Zn(NO_3)_2$ and $SC(NH_2)_2$ is introduced into a reactor 101, in which it is adjusted to a normal pressure inert gas atmosphere, and heated up to a range from 600° C. to 700° C. with a heater 102 provided on the reactor 101. The source gas heated causes a chemical reaction as defined in the following formula (FI), thus ZnS fine particle cores are generated.

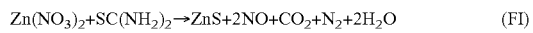

$$Zn(NO_3)_2 + SC(NH_2)_2 \rightarrow ZnS + 2NO + CO_2 + N_2 + 2H_2O \quad \text{(FI)}$$

The ZnS fine particle cores grow larger in the process of moving inside the reactor. The ZnS fine particles thus obtained are discharged from the reactor 101 together with other gas and diluted with inert gas on the way, then the ZnS fine particles and the inert gas are introduced to a cooling device 103 and cooled down to a room temperature.

The cooled gas containing the generated fine particles passes through a collector 104 filled with a solution containing a surfactant. Thus, only the generated particles are collected in the solution and preserved in a dispersed state.

FIG. 2A and FIG. 2B are graphs concerning the above-described vapor-phase growth method, which show variations in the number of generation and sizes of fine particles with respect to reactive time starting from the time when the source gas is introduced into the reactor 101 and a fine particle generating reaction is initiated.

As shown in FIG. 2A, the number of generation of the fine particles increases constantly in the beginning with passage of time. However, the number of generation is saturated after 0.001 second or thereabout, and then the number of generation gradually decreases thereafter with time. After a lapse of 0.1 second, the degree of decrease in the number of generation of the fine particles is significantly accelerated.

In the meantime, as shown in FIG. 2B, an average particle size scarcely changes for 0.001 second or thereabout when the number of generation of the fine particles is constantly increasing. However, the average grain size starts increasing with passage of time after 0.001 second or thereabout when the number of generation of the fine particles is saturated.

Based on these data, it is conceivable that growth of the fine particles proceeds with the following three stages (I to III) according to the particle growth method using the conventional vapor-phase growth method.

First stage (I): The source gas is decomposed and the fine particle cores (molecules) are generated as seeds of particle generation. In this process, although the number of the fine particles increases, the fine particle sizes scarcely change (A fine particle core generating process).

Second stage (II): The generated fine particle cores are bonded together in a range from several to several hundred particles and grow into clusters in nanometer sizes. Therefore, at this stage, the number of generation of the fine particles decreases with passage of time; meanwhile, the fine particle sizes start increasing (A fine particle cluster generating process).

Third stage (III): The clusters generated in nanometer sizes cohere to form fine particles in sizes of 10 nanometers or larger. Accordingly, the number of generation of the fine particles decreases further (A cluster cohering process).

Among the above-described three stages, generation of the fine particle cores in sizes of 10 nanometers or below suitable for exerting a quantum effect progresses most efficiently during the first stage. However, as shown in FIG. 2A and FIG. 2B, the first stage ends in an extremely short period as the first stage lasts only for 0.001 second at the longest from initiation of the fine particle generating reaction. When the conventional vapor-phase growth method is applied, it is impossible to control the reactive time in a range within 0.1 second. Accordingly, the growth of the fine particles progresses toward the third stage inevitably. As a result, as shown in FIG. 3, the obtained fine particles include a considerable number of fine particles larger than 10 nanometers.

Therefore, in order to obtain the fine particles in the sizes within 10 nanometers which exert the quantum effect, required is an additional operation for extracting only the fine particles in a predetermined size range by use of a classifier out of the fine particles collected and preserved in accordance with the conventional manufacturing method. As a result, additional costs are involved upon manufacturing the fine particles.

SUMMARY OF THE INVENTION

An object of the present invention is to provide a method capable of manufacturing fine particles in sizes within 10 nanometers without a requirement of classification, and to provide an apparatus for manufacturing fine particles for use in the manufacturing method.

In a first aspect of the method of manufacturing fine particles according to the present invention, a reactive gas flow containing a fine particle source material is introduced into a reactor from one side, and then fine particles are grown in a gas phase by heating in the reactive gas flow. Meanwhile, a diluting gas flow is introduced into the reactor from the other side, which is almost counter-flow to the direction of the reactive gas flow. Further, flow rates of the reactive gas flow and the diluting gas flow with respect to a cross section of a flow channel are severally equalized substantially, and then the reactive gas flow and the diluting gas flow are merged so as to stop growth of the fine particles.

In a second aspect of the method of manufacturing fine particles according to the present invention, a reactive gas flow containing a fine particle source material is introduced into a reactor from one side, and a diluting gas flow is introduced from the other side being almost counter-flow to the reactive gas flow. While the reactive gas flow and the diluting gas flow are merged, the fine particle source material is excited to grow fine particles in such a merging region and the growth of the fine particles is stopped by dilution owing to the diluting gas flow.

A first aspect of an apparatus for manufacturing fine particles according to the present invention includes a reactor, a first inlet part provided on one side of the reactor, which has at least one port introducing a reactive gas flow containing a fine particle source material, a second inlet part provided on the other side in the reactor being approximately counter-flow to the side of the first inlet part, which has at least one port introducing a diluting gas flow, and a heater which excites the fine particle source material contained in the reactive gas flow. In addition, the apparatus further includes a first plate disposed inside the reactor almost perpendicularly with respect to the reactive gas flow and having through-holes which substantially equalize a flow rate of the reactive gas flow with respect to a cross section of a flow channel, and a second plate disposed inside the reactor almost perpendicularly with respect to the diluting gas flow and having through-holes which substantially equalize a flow rate of the diluting gas flow with respect to a cross section of a flow channel. Furthermore, the apparatus further includes a gas exhaust port provided in a merging region where the reactive gas flow passing through the first plate and the diluting gas flow passing through the second plate are merged, and a collector which collects fine particles contained in the gas discharged from the gas exhaust port.

A second aspect of the apparatus for manufacturing fine particles according to the present invention includes a reactor, a first inlet part provided on one side of the reactor, which has at least one port introducing a reactive gas flow containing a fine particle source material, a second inlet part provided on the other side of the reactor being approximately counter-flow to the side of the first inlet part, which has at least one port introducing a diluting gas flow, a plasma generator which generates plasma in a merging region where the reactive gas flow and the diluting gas flow are merged, a gas exhaust port provided adjacently to the merging region, and a collector which collects fine particles contained in the gas discharged from the gas exhaust port.

A third aspect of the apparatus for manufacturing fine particles according to the present invention includes a reactor, a first inlet part provided on one side of the reactor, which has at least one port introducing a reactive gas flow containing a fine particle source material, a second inlet part provided on the other side in the reactor being approximately counter-flow to the side of the first inlet part, which has at least one port introducing a diluting gas flow, a heater which heats the diluting gas flow, a gas exhaust port provided in a merging region where the reactive gas flow and the diluting gas flow are merged, and a collector which collects fine particles contained in the gas discharged from the gas exhaust port.

BRIEF DESCRIPTION OF THE DRAWINGS

FIG. 3 is a graph showing distribution of particle sizes of the fine particles obtained in accordance with the conventional method of manufacturing fine particles.

FIG. 6 is a graph showing a result of simulation of temperature distribution in a gas merging region when a gas-flow controlling plate is used in a manufacturing method according to the first embodiment.

FIG. 7 is a graph showing distribution of particle sizes of the fine particles obtained in the method of manufacturing fine particles according to the first embodiment.

DETAILED DESCRIPTION OF THE PREFERRED EMBODIMENTS

First Embodiment

Figure 1:
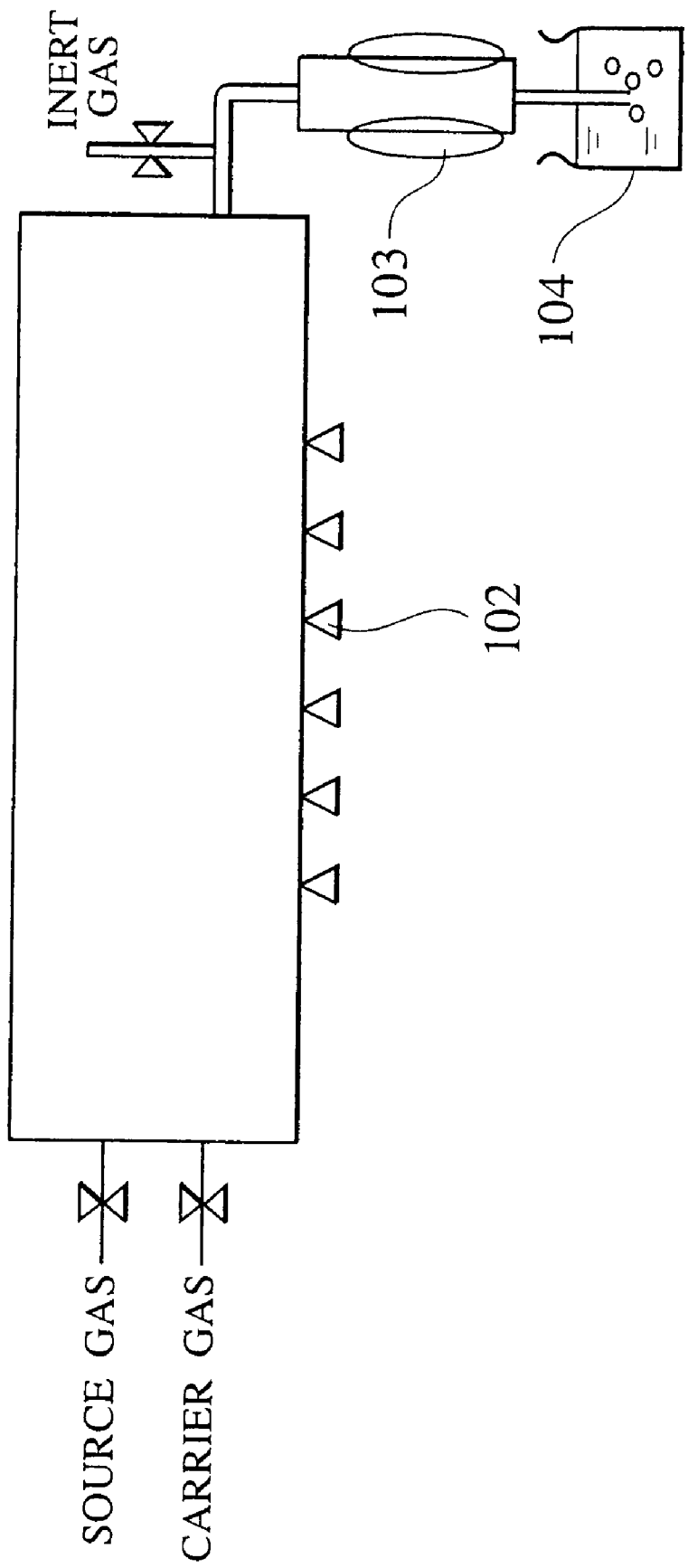
FIG. 1 is a view showing a constitution of a conventional apparatus for manufacturing fine particles.
Figure 2A:
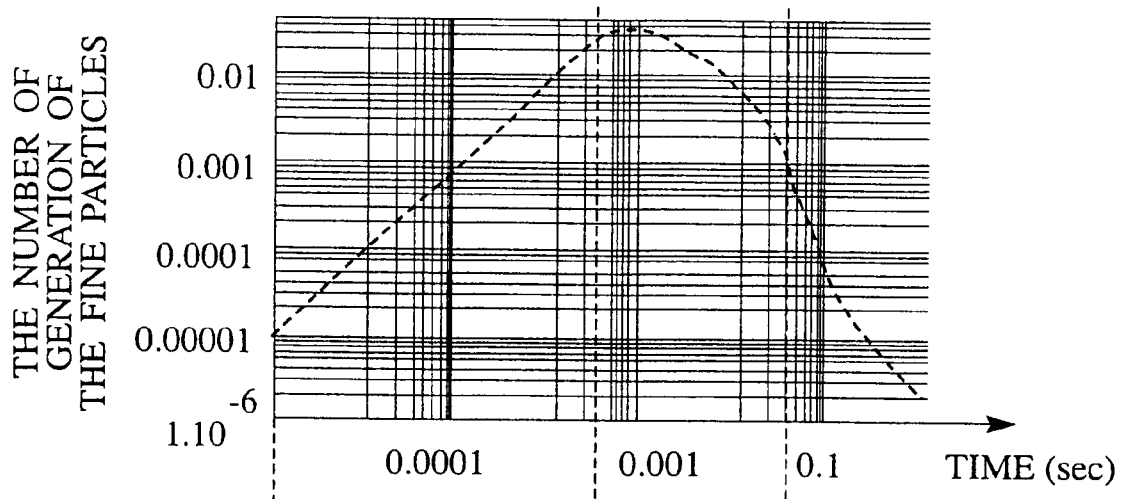
FIG. 2A is a graph showing the relation between reactive time and the number of generation of fine particles in the case of using a conventional method of manufacturing fine particles.
Figure 2B:
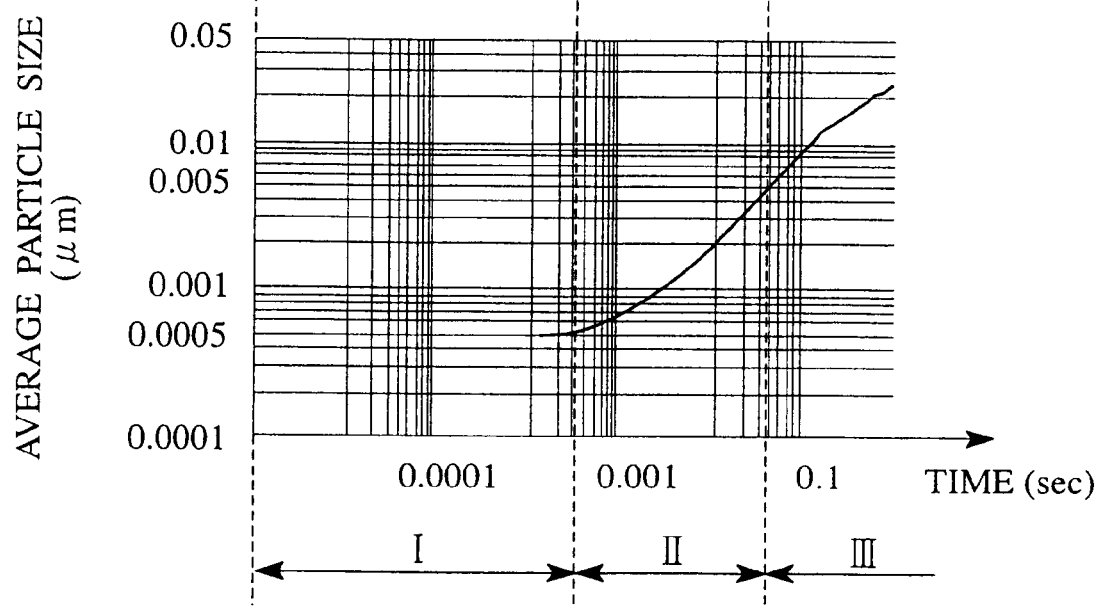
FIG. 2B is a graph showing the relation between the reactive time and average particle sizes in the case of using the conventional method of manufacturing fine particles.
Figure 4:
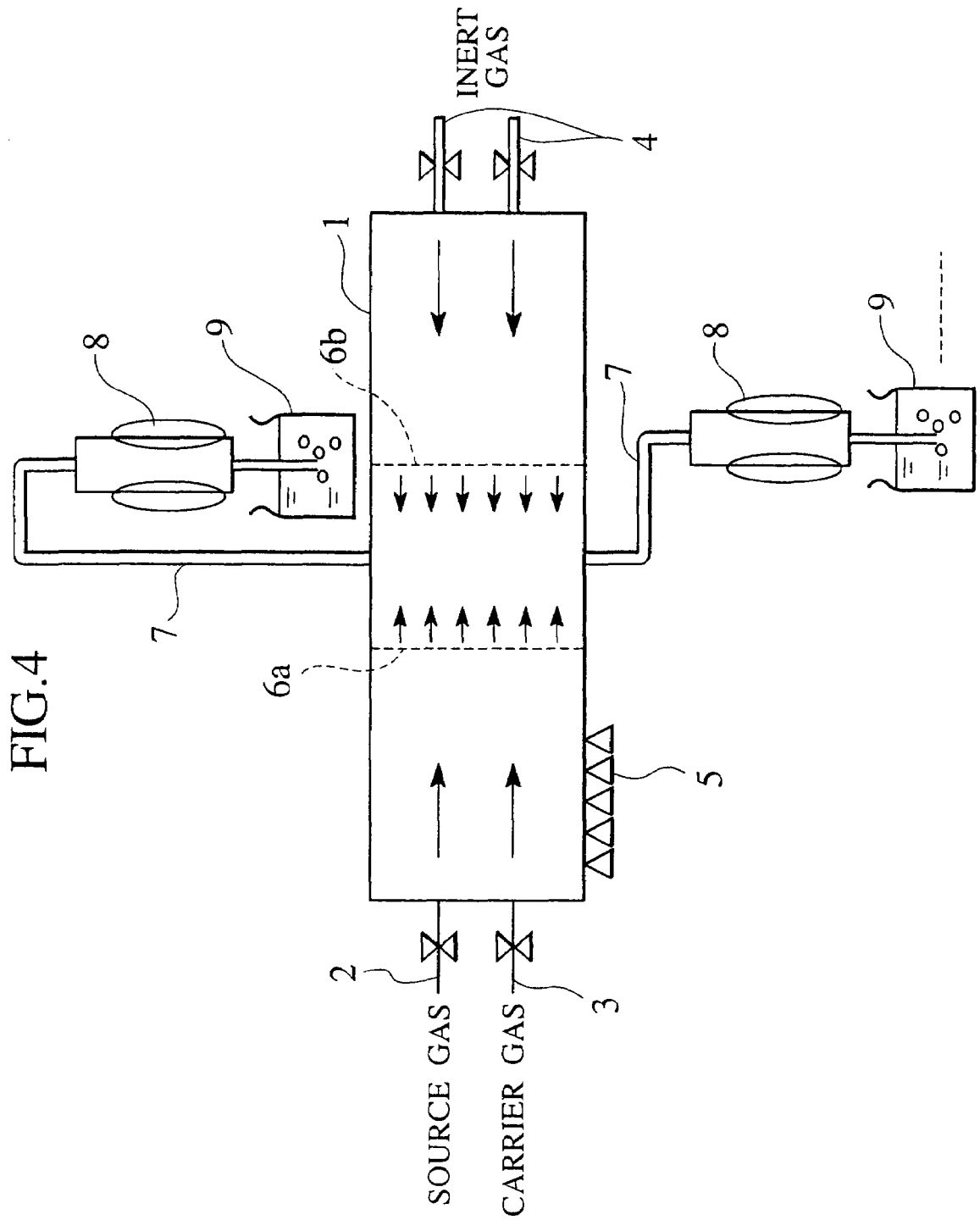
FIG. 4 is a constitutional view showing an apparatus for manufacturing fine particles according to a first embodiment of the present invention.

FIG. 4 is a constitutional view of an apparatus for manufacturing fine particles according to a first embodiment. This apparatus for manufacturing fine particles includes a source gas inlet part 2 and a carrier gas inlet part 3 provided on one end of a reactor 1, and a diluting gas inlet part 4 provided on the other end. Moreover, in middle of a flow channel of a composite gas flow of the source gas and the carrier gas (hereinafter referred to as a "reactive gas flow") inside the reactor 1, a gas-flow controlling plate 6a is disposed almost perpendicularly with respect to the gas flow channel in the reactor 1 for equalizing a flow rate of the reactive gas flow with respect to a cross section of the flow channel. Similarly, a gas-flow controlling plate 6b is also disposed in the middle of a flow channel of a diluting gas flow for equalizing a flow rate of the inert gas flow with respect to a cross section of the flow channel.

The gas-flow controlling plate 6 (6a or 6b) is typically a heat-resistive plate made of metal or ceramics provided with a plurality of through-holes. To be more precise, various examples of the gas-flow controlling plates are illustrated in FIG. 5A to FIG. 5D. On a gas-flow controlling plate 61 shown in FIG. 5A, a plurality of pin holes 62 are uniformly formed with intervals of several millimeters on a plate made of metal or ceramics. Although the size of the gas-flow controlling plate 61 and the size and the number of the pin holes 62 depend on the size of the reactor 1, the gas flow rates or the like, the gas-flow controlling plate 61 is also designed to satisfy a condition for equalizing the flow rate of the gas flow passing through the gas-flow controlling plate 6 with respect to the cross section of the flow channel. For example, the size of the pin holes (through-holes) 62 is set in a range from about 0.1 to 0.5 mmφ, so that the flow rate of the gas flow thus obtained is adjusted approximately to 100 cm/sec.

Figure 5A:
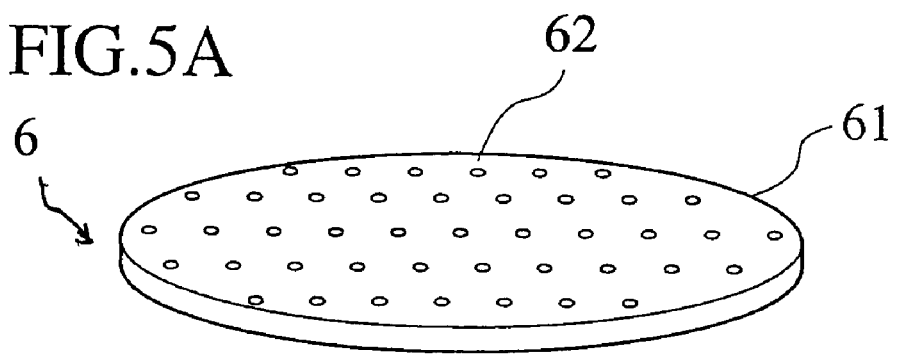
FIGS. 5A to 5D are perspective views showing examples of gas-flow controlling plates for use in the apparatus for manufacturing fine particles according to the first embodiment.
Figure 5B:
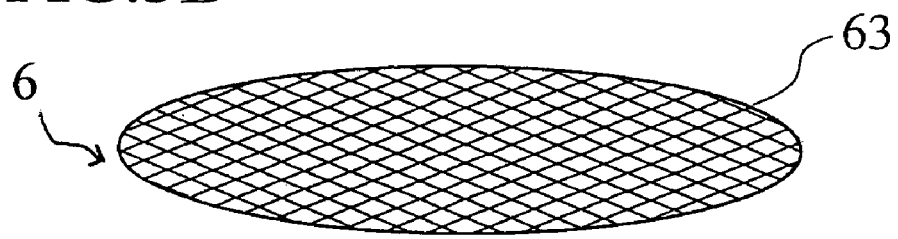

The gas-flow controlling plate 6 shown in FIG. 5B is a meshed plate 63 such as a metallic wire mesh. Note that a single metallic wire mesh may be used as the gas-flow controlling plate 6 as shown in FIG. 5B, or a plurality of metallic wire meshes may be stacked and used as the gas-flow controlling plate 6, alternatively.

Figure 5C:
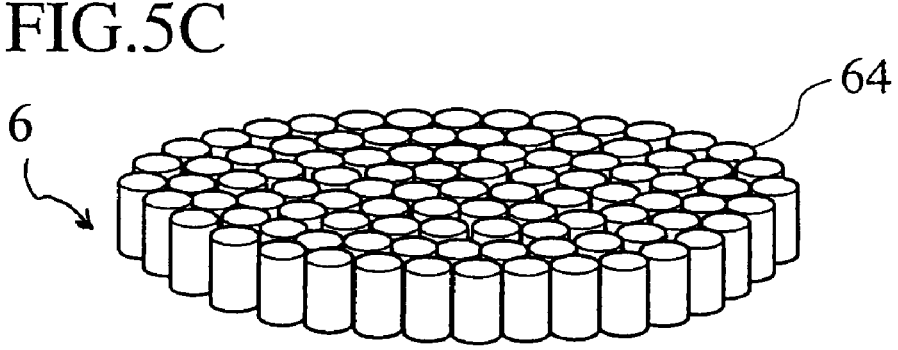

Furthermore, as shown in FIG. 5C, a plate 64 composed of a bundle of heat-resistive metallic or ceramic tubes may be also used as the gas-flow controlling plate 6. In this case, the tubes should be disposed parallel to the gas flow. Lengths or sizes of the respective tubes may vary as long as the gas-flow controlling plate 6 can satisfy a condition for equalizing the flow rate of the gas flow passing through the gas-flow controlling plate 6 with respect to the cross section of the flow channel. Otherwise, it is also possible to use a metallic or ceramic carrier having a plurality of honeycomb cavities as the gas-flow controlling plate 6.

Figure 5D:
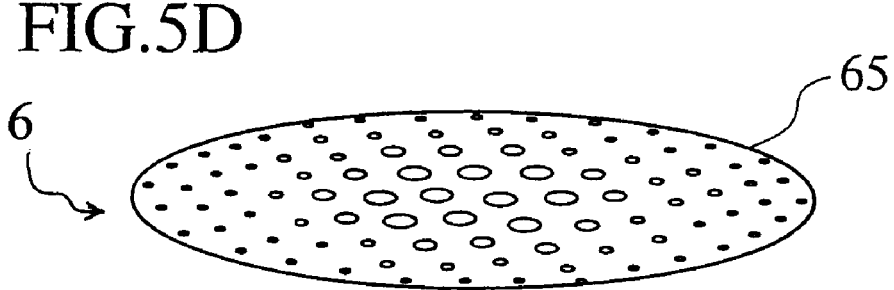

It should be noted that the respective small through-holes to be formed on the gas-flow controlling plates 6 do not have to be formed entirely into the same size or the same shape. In general, the gas flow reaching the gas-flow controlling plate 6 tends to show a faster flow rate in the center of the flow channel and a slower flow rate in the periphery thereof. Accordingly, with a plate 65 as shown in FIG. 5D, the flow rate of the gas flow with respect to the cross section of the flow channel can be equalized more easily if the sizes of the small through-holes in a central portion are made larger and the sizes of the small through-holes in a peripheral portion are made gradually smaller outward.

It is not necessary to use the same type for the two gas-flow controlling plates 6a and 6b. In other words, materials or shapes of the gas-flow controlling plates 6a and 6b can be independently selected as appropriate for each plate.

A distance between the two gas-flow controlling plates 6a and 6b is set in a range from 5 cm to 20 cm, more preferably to about 10 cm, for example, so that the reactive gas flow and the diluting gas flow can be merged while maintaining the respective flow rates after rectification.

The gas exhaust port 7 is disposed on a wall of the reactor in a region where the reactive gas flow and the diluting gas flow are merged. The discharged gas containing the fine particles is transferred via a cooling device 8 to a fine particle collector 9 for collecting and preserving fine particles. The fine particle collector 9 is filled with a solution of water, methanol or the like, which contains a surfactant such as a fatty acid salt. Accordingly, only the fine particles are collected while the discharged gas passing through them, and the rest of the gas is discharged to the atmosphere. A surfactant includes molecules each composed of a hydrophilic group which tends to link water, and a lipophilic group (also referred to as a hydrophobic group) which tends to link oil. Therefore, a surface of each fine particle caught by the solution is covered with the surfactant, thus the fine particles are prevented from cohesion and stored in the fluid while maintaining a dispersed state.

Although the size and the shape of the reactor are not particularly limited, it is possible to use a cylindrical reactor applicable to a CVD apparatus for 8-inch wafers.

Moreover, provision of the gas exhaust port 7 is not necessarily limited to one location. Instead, two or more gas exhaust ports may be provided as shown in FIG. 4. As the exhaust ports are provided more, the reactive gas flow and the diluting gas flow after merging can be discharged more smoothly. When the gas exhaust ports 7 are provided in pluralities, the cooling device 8 and the fine particle collector 9 may be provided severally on each gas exhaust port. Alternatively, the plurality of gas exhaust ports 7 may be joined to one common pipe, and the pipe may be connected to a common cooling device 8 and to a common fine particle collector 9.

Now, description will be made with reference to FIG. 4 regarding a method of manufacturing fine particles according to the first embodiment by use of the above-described apparatus for manufacturing fine particles. Specifically, a method of manufacturing ZnS fine particles, which are usable as fluorescent materials, will be described as an example.

$Zn(CH_3)_2$ and $H_2S$ are used as the source gas, for example. As for the carrier gas for the source gas, inert gas such as nitrogen can be used. Moreover, the inert gas such as nitrogen can be also used as the diluting gas. Each gas is preserved in a dedicated tank (not shown).

First, the inert gas as the carrier gas is introduced into the reactor 1 from the carrier gas inlet part 3, and the inert gas as the diluting gas is introduced into the reactor 1 from the diluting gas inlet part 4. These gases constitute a gas flow toward the exhaust ports 7.

Here, it is preferable that the amounts of the flow of the two types of the introduced gas are controlled to be almost equal. The carrier gas flow and the diluting gas flow introduced are controlled by the gas-flow controlling plates 6a and 6b to have the uniform flow rates with respect to the cross section of the flow channel respectively. Then, the carrier gas flow and the diluting gas flow are collided and merged almost in the center of the space between the gas-flow controlling plate 6a and the gas-flow controlling plate 6b. Thereafter, the merged gas is discharged from the adjacent gas exhaust ports 7 smoothly. Accordingly, occurrence of a turbulent flow caused by the collision of the gas flows hardly affects the surrounding.

Next, the inside of the reactor 1 is heated up to a range from 600° C. to 700° C. with the heater 5 and the pressure inside the reactor 1 is set to $1.013 \times 10^5$ Pa (760 torr). While, the temperature of the cooling device 7 is set to a room temperature and the pressure thereof is set to $1.013 \times 10^5$ Pa (760 torr) as similar to the inside of the reactor 1.

When the gas flows and the temperature inside the reactor 1 become stable, the source gas containing $Zn(CH_3)_2$ gas and $H_2S$ gas is introduced from the source gas inlet part 2 into the reactor 1. The source gas flow constitutes the reactive gas flow together with the carrier gas already flowing, and the reactive gas flow flows inside the reactor 1.

The source gas introduced into the reactor 1 is heated up to the range from 600° C. to 700° C. in the process of passing through a portion where the heater 5 is provided, thus the source gas causes a pyrolytic reaction as shown in the following chemical formula (FII) and generates solid ZnS molecules. Such ZnS molecules become ZnS fine particle cores.

$Zn(CH_3)_2 + H_2S \rightarrow ZnS \text{ (solid)} + 2CH_4 \text{ (gas)}$ (FII)

The carrier gas and the source gas containing, i.e. the reactive gas flow containing the ZnS fine particles is controlled to have a uniform flow rate with respect to the cross section of the flow channel by use of the gas-flow controlling plate 6a while proceeding with the fine particle core generating reaction, and then the reactive gas flow merges with the diluting gas flow, which is similarly controlled to have a uniform flow rate with respect to the cross section of the flow channel. When the two type gas flows are merged, the reactive gas is diluted immediately, thus, growth of the fine particles is stopped.

According to the conventional method, the growth of fine particles inevitably proceeds with the "fine particle core generating process" of the first stage (I), the "fine particle cluster generating process" of the second stage (II) and the "cluster cohering process" of the third stage (III). Then, the growth of the fine particles is stopped by merging with the diluting gas outside the reactor and the fine particles are collected thereafter. On the contrary, according to the method of manufacturing fine particles according to the first embodiment, the reactive gas flow which is excited by heating merges with the diluting gas flow which is counter-flow. Therefore, surfaces of the ZnS fine particles in the reactive gas flow are covered with nitrogen in the diluting gas at a very early stage. Accordingly, clustering of the ZnS fine particles at the second stage (II) and cohesion of the clusters at the third stage (III) are suppressed. Thus, the growth of the fine particles will be stopped at the first stage (I) or in mid-course of the second stage (II). As a result, it is possible to suppress the growth of the fine particle sizes up to some 5 nm on the average.

Moreover, in the first embodiment, the reactive gas flow and the diluting gas flow are adjusted to the uniform flow rates with respect to the cross section of the flow channel in the process of passing through the gas-flow controlling plates 6a and 6b respectively. Accordingly, a time interval for the reactive gas flow to merge with the diluting gas flow is equalized within the cross section of the gas flow channel. The time interval required for merger controls a time period for the growth of the fine particles. The fact that the time period for the growth of the fine particles becomes equal irrespective of the location refers to nothing else but capability of equalizing the sizes of the obtained fine particles. Therefore, it is possible to uniform the sizes of the obtained fine particles.

The above-described effect of the gas-flow controlling plates 6 can be conceptually explained as follows. Here, assuming that the gas-flow controlling plates are infinitely large flat plates, consideration will be made regarding the flows to be formed in the case that the two flat plates are disposed in a mutually facing manner and gas is emitted out of each flat plate. Note that the flow of the gas is assumed to be a steady-state laminar flow.

An equation for the flow refers to a formula of conservation of mass in a steady state (an equation of continuity) based on a cylindrical coordinate system, which is expressed as:

$$\frac{\partial u}{\partial r} + \frac{u}{r} + \frac{\partial w}{\partial z} = 0 \tag{f1}$$

Here, u and w refer to components of velocity in a radial direction and in an axial direction, respectively.

If the above-described equation is subjected to variable transformation using functions g and f relevant only to the axial direction of the gas flow, then, $$g(z) = \frac{u}{r}, \tag{f2}$$

$$f(z) = -\frac{w}{2} \tag{f3}$$

are applicable. Accordingly, the equation of continuity can be expressed only by using the component z of the axial direction of the gas flow, such as:

$$g(z) = \frac{df(z)}{dz} \tag{f4}$$

Meanwhile, equations of conservation of momentum are expressed by the following formulae:

$$u\frac{\partial u}{\partial r} + w\frac{\partial u}{\partial z} = -\frac{1}{\rho}\frac{\partial p}{\partial r} + v\left(\frac{\partial^2 u}{\partial r^2} + \frac{1}{r}\frac{\partial u}{\partial r} - \frac{u}{r^2} + \frac{\partial^2 u}{\partial z^2}\right) \tag{f5}$$

$$u\frac{\partial w}{\partial w} + w\frac{\partial w}{\partial z} = -\frac{1}{\rho}\frac{\partial p}{\partial z} + v\left(\frac{\partial^2 w}{\partial r^2} + \frac{1}{r}\frac{\partial w}{\partial r} + \frac{\partial^2 w}{\partial z^2}\right) \tag{f6}$$

Here, $\rho$ refers to density and $v$ refers to kinematic viscosity.
By applying the following constant, namely, $$H = \frac{1}{r}\frac{\partial p}{\partial r} = \text{constant} \tag{f7}$$

to these two equations of momentum, an ordinary differential equation using only the parameter v is derived as follows:

$$vf''' - 2ff'' + f'^2 + \frac{H}{\rho} = 0 \tag{f8}$$

Therefore, by resolving the above-mentioned formulae (f4), (f7) and (f8), it is possible to find the solutions g and f, which are not dependent on the radius. As a result, the component w of velocity in the axial direction of the gas flow constitutes a constant value irrespective of the radius. After all, it is possible to explain conceptually that the mode of mixture of the two gas flows, which are collided and merged after passing through the gas-flow controlling plates, becomes uniform with respect to the cross section of the gas flow channel regardless of the location.

FIG. 6 is a graph showing temperatures in the merging region of the gas passing through the gas-flow controlling plates 6a and 6b in the first embodiment, which are obtained by simulation. The axis of ordinates indicates the temperature and the axis of abscissas indicates the distance from the gas-flow controlling plate 6b, which is disposed in the gas flow channel of the diluting gas. The graph plots a temperature (T1) variation on the central axis of the gas flow and a temperature (T2) variation in a position away from the central axis by 2 cm in the radial direction. Note that the simulations applies the condition in that a distance between the two gas-flow controlling plates 6a and 6b is set to 5 cm and that the reactive gas heated up to 1000 K (727° C.) flows from top down and the diluting gas at 300 K (27° C.) flows from bottom up.

As shown in FIG. 6, the temperature (T1) on the central axis of the gas flow and the temperature (T2) in the position distant from the central axis by 2 cm in the radial direction are almost the same. Accordingly, it is learned that the mode of mixture of the two types of the gas severally having the different temperatures are almost uniform in the direction of the cross section of the flow channel. From this result, it is confirmed that a uniform reaction can be achieved regardless of the position in the cross section of the flow channel. Although the temperature of the gas drops sharply in the merging region (in the position about 2 cm away from the gas-flow controlling plate 6b), such a region causing the sharp temperature change is limited to very narrow part of the merging region. Accordingly, it is also learned that an influence of the turbulent flow caused by the merger of the gas is hardly diffusive. Such an effect of the gas-flow controlling plates is similarly applicable to other embodiments to be described later.

The fine particles thus obtained are discharged from the gas exhaust ports 7 together with the reactive gas and the diluting gas. A temperature of the gas immediately after discharge is at 100° C. or thereabout. However, the gas is cooled down to a room temperature in the course of passing through the cooling devices 8. The discharged gas containing the fine particles is further guided to the fine particle collectors 9. When the discharged gas passes through a solution based on a solvent of ethanol, methanol or the like dissolving a surfactant, the ZnS fine particles are collected and the rest of the discharged gas is discharged to the atmosphere.

In this way, the ZnS fine particles are preserved within the solution in the fine particle collector 9 in a dispersed state. When ZnS fine particles are necessary, the ZnS fine particles can be obtained by heating and drying the solution preserved in the fine particle collector 9.

FIG. 7 shows distribution particle sizes of the ZnS fine particles, which are manufactured by use of the method for manufacturing fine particles according to the first embodiment. It is learned that the range of the distribution of particle sizes is narrower as compared to the distribution of particle sizes obtained in accordance with the conventional manufacturing method, and that the fine particles with sizes of several nanometers are obtained intensively.

Although only about 30% of the total fine particles obtained by the conventional manufacturing method have the particle sizes within 5 nm, the fine particle having the particle sizes within 5 nm occupies 90% or more in the total fine particles obtained by the manufacturing method according to the first embodiment. Therefore, a process of further classifying the fine particles collected is not required unlike the prior art.

The obtained ZnS particles with the particles sizes of several nanometers exert quantum effects. Accordingly, if the ZnS particles are used in light-emitting elements such as LEDs, it is possible to manufacture the light-emitting elements with high emission efficiency.

Note that the heater 5 is provided on an outside wall of the reactor in the apparatus for manufacturing fine particles of the first embodiment. Here, it is preferable that the heater 5 is provided only on the outside wall of the reactor 1 in the vicinity of the central portion thereof. If the heater 5 is provided in the vicinity of the source gas inlet part 2 or the carrier gas inlet part 4, the fine particles generated by the generating reaction tend to adhere to the vicinities of the respective inlet parts. Accordingly, there is a risk that the fine particles close the respective inlet parts after continuous use. In the meantime, it is also preferred to shorten the interval from the time of thermal excitation of the reactive gas flow with the heater 5 to the time when the reactive gas flow and the diluting gas flow are merged, in terms of avoiding overgrowth of the generated particles.

In the above-described condition, the temperature of the reactive gas flow is set in the range from 600° C. to 700° C. However, it is also possible to conduct the reaction in a wider temperature range, such as a range from 100° C. to 1000° C. When the temperature is set higher, the speed of growth of the fine particles becomes faster, therefore, the particle sizes of the obtained fine particles become slightly larger. On the contrary, when the temperature is set lower, the speed of growth of the fine particles becomes slower, whereby the particle sizes of the obtained fine particles become smaller.

Moreover, in the above-described condition, the pressure inside the reactor is set to $1.013 \times 10^5$ Pa (760 torr). However, it is also possible to use the reactor in a pressure range from $1.33 \times 1.0^3$ Pa to $1.013 \times 10^5$ Pa (10 to 760 torr). When the pressure is set lower, the speed of growth of the fine particles becomes slower, whereby the particles sizes of the obtained fine particulars become smaller. In addition, when the pressure inside the reactor is set lower, it is also possible to prevent the occurrence of undesired mixed flow due to a thermal convection caused by the heated gas and the diluting gas.

Moreover, although just one pipe is described above as an example of the source gas inlet part 2, it is also possible to provide a plurality of source gas inlet parts.

As for surfactants and the like to be contained in the solution filled in the fine particle collector 9, there are cited various surfactants such as anionic surfactants (fatty acid salts, alkyl sulfates, acid esters, polyoxyethylene, alkyl ethers, sulfuric acid esters, alkylbenzene sulfonates, alkylnaphthalene sulfonates, alkyl sulfosuccinates, alkyl diphenylether disulfonates, alkyl phosphates and other anionic surfactants, naphthalene sulfuric acid formaldehyde condensates, and special polycarboxylic type high polymer surfactants), nonionic surfactants (surfactants containing long-chain alkyls such as polyoxyethylene alkyl ethers, polyoxyalkylene alkyl ethers, polyoxyethylene derivatives, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene alkyl amines, alkyl alkanol amides, trioctylphosphine oxide, dodecylamines and alkanthiols, and other nonionic surfactants), cationic surfactants (alkyl amine salts, quaternary ammonium salts, and other cationic surfactants), amphoteric surfactants (alkyl betaines, amine oxides, and other amphoteric surfactants), and other surface modification agents.

As described above, in the case of using the method of manufacturing fine particles according to the first embodiment, the source gas is excited by heating so as to initiate growth of the fine particles, and then the growth of fine particle is stopped immediately after the merger with the diluting gas. Accordingly, it is possible to shorten the time period of the fine particle generating reaction and thereby suppress increases in particle sizes due to cohesion. Moreover, the reactive gas flow and the diluting gas flow are merged after the flow rates of the respective gas flows are equalized with respect to the cross section of the flow channel. Accordingly, it is possible to equalize the time period from initiation to termination of the fine particle generating reaction on the cross section of the flow channel. Therefore, the range of distribution of the particle sizes of the obtained fine particles can be narrowed. Thus, it is possible to obtain the fine particles in even sizes within 10 nm suitable for exerting the quantum effects, and the classification process is not required unlike the prior art. As a result, it is possible to improve raw material efficiency of the source gas and to reduce the manufacturing costs.

Second Embodiment

Figure 8:
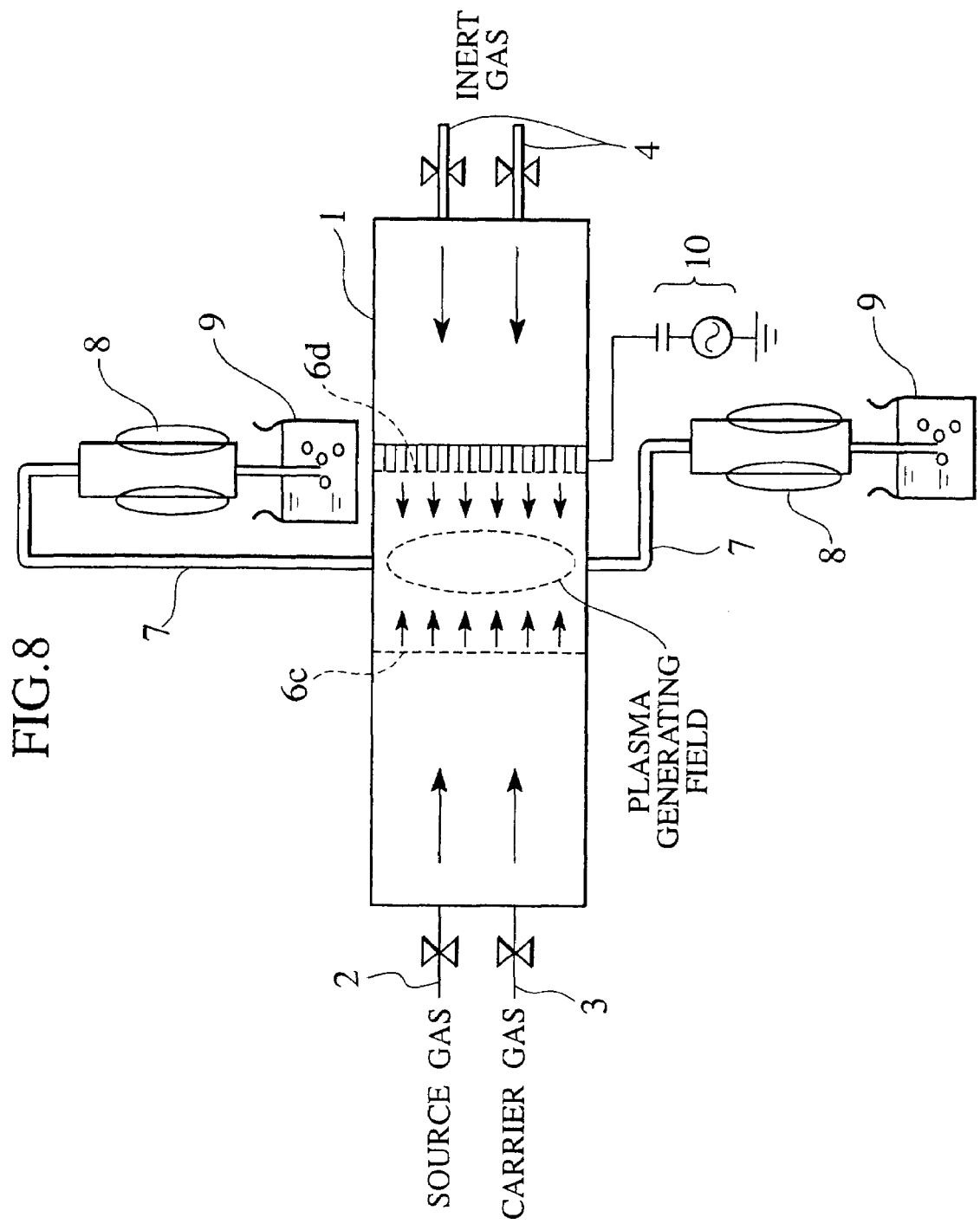
FIG. 8 is a view showing a constitution of an apparatus for manufacturing fine particles according to a second embodiment of the present invention.

FIG. 8 shows a constitutional view of an apparatus for manufacturing fine particles according to a second embodiment. The apparatus for manufacturing fine particles of the second embodiment has a constitution substantially similar to the apparatus for manufacturing fine particles according to the first embodiment. However, a large difference is that the apparatus according to the second embodiment includes a plasma-generating power source 10 as a source gas excitation device.

Specifically, the apparatus for manufacturing fine particles according to the second embodiment also includes a source gas inlet part 2 and a carrier gas inlet part 3 provided on one end of a reactor 1, a diluting gas inlet part 4 provided on the other end counter-flow thereto. Gas-flow controlling plates 6c and 6d provided in the middle of a flow channel of a reactive gas flow composed of the source gas and the carrier gas and the middle of a diluting gas flow for equalizing flow rates of the gas flow with respect to a cross section of the flow channel respectively. Moreover, the gas-flow controlling plates 6c and 6d are made of metallic plates so as to function also as counter electrodes for generating plasma inside the reactor 1. One of the gas-flow controlling plates is connected to the plasma-generating power source 10. The plasma is generated in a region where the reactive gas flow and the diluting gas flow are merged. Note that it is also possible to provide discrete counter electrodes required for generation of the plasma on upper and lower sides independently of the gas-flow controlling plates 6c and 6d.

Moreover, gas exhaust ports 7 are provided on a wall of the reactor 1 in a gas merging region, and each pipe on the gas exhaust port 7 is drawn out to a fine particle collector 9 via a cooling device 8.

Now, description will be made with reference to FIG. 8 regarding a method of manufacturing fine particles according to the second embodiment by use of the above-described apparatus for manufacturing fine particles. A method of manufacturing ZnS fine particles, which are usable as fluorescent materials, will be described as an example. The carrier gas and the diluting gas for use in this embodiment are similar to those used in the first embodiment.

First, inert gas as the carrier gas is introduced into the reactor 1 from the carrier gas inlet part 3, and inert gas as the diluting gas is introduced into the reactor 1 from the diluting gas inlet part 4. These gases constitute a gas flow toward the exhaust ports 7. Such a gas flow further flows to the cooling devices 8 and to the fine particle collectors 9.

Next, the pressure inside the reactor 1 is set in a range from $1.33 \times 10^2$ to $6.67 \times 10^3$ Pa (1 to 50 torr), preferably at $1.33 \times 10^2$ Pa. The gas pressure inside each of the cooling devices 8 is set to the same pressure as the pressure inside the reactor. Thereafter, the plasma is generated inside the reactor 1 by use of the plasma-generating power source 10. Moreover, the temperature in the plasma-generating region is set in a range from 400° C. to 500° C. by use of a heater (not shown).

Subsequently, the source gas containing $Zn(NO_3)_2$ and $SC(NH_2)_2$ is introduced into the reactor 1. The introduced source gas constitutes the reactive gas flow together with the carrier gas and passes through the gas-flow controlling plate 6c. After a flow rate of the reactive gas flow is equalized with respect to the cross section of the flow channel, the reactive gas flow further flows into the plasma-generating region. Here, a plasma reaction as expressed by the following formula (FIII) takes place, whereby the respective ingredients of the source gas are excited for generating ZnS molecules. Such ZnS molecules constitute ZnS fine particle cores.

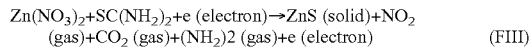

$$Zn(NO_3)_2 + SC(NH_2)_2 + e \text{ (electron)} \rightarrow ZnS \text{ (solid)} + NO_2 \text{ (gas)} + CO_2 \text{ (gas)} + (NH_2)2 \text{ (gas)} + e \text{ (electron)} \quad \text{(FIII)}$$

Meanwhile, a nitrogen gas flow as the diluting gas, which is adjusted to a gas flow with a uniform flow rate with respect to the cross section of the flow channel, flows into the plasma-generating region and merge with the reactive gas flow. As the diluting gas covers surfaces of the generated ZnS particles, further growth of the fine particles is stopped.

As described above, according to the method of manufacturing fine particles of the second embodiment, the growth of the fine particles is stopped by the diluting gas immediately after the reaction caused by the plasma excitation. Accordingly, the growth of the fine particles is surely stopped in the "fine particle core generating process" of the first stage (I) or in mid-course of the "fine particle cluster generating process" of the second stage (II). As a result, it is possible to suppress the growth of the fine particle sizes up to some 3 nm on the average.

In addition, according to the second embodiment as well, the flow rates of the reactive gas flow and the diluting gas flow are equalized severally with respect to the cross section of the flow channel in the course of passing through the gas-flow controlling plates 6c and 6d. Therefore, a time period until merger of the reactive gas and the diluting gas is equalized at any location on the cross section of the flow channel. Since the time interval from start to end of the fine particle generating reaction is equalized in terms of the direction of the cross section of the flow channel, it is thereby possible to equalize sizes of the obtained fine particles.

The fine particles thus obtained are discharged from the gas exhaust ports 7 together with the reactive gas and the diluting gas. A temperature of the gas immediately after discharge is at 100° C. or thereabout. However, the gas is cooled down to a room temperature in the course of passing through the cooling devices 8.

The discharged gas containing the fine particles is further guided to a solution containing a surfactant filled in the fine particle collector 9, whereby the ZnS fine particles are collected by the solution and the rest of the discharged gas is discharged to the atmosphere.

In this way, the ZnS fine particles are preserved within the solution in the fine particle collector 9 in a dispersed state. When ZnS fine particles are necessary, the ZnS fine particles can be obtained by heating and drying the solution preserved in the fine particle collector 9.

As described above, in the case of using the method of manufacturing fine particles according to the second embodiment, the source gas is excited by plasma and thereby causes the reaction for generating the fine particles in the merging region of the reactive gas flow and the diluting gas flow, and then the growth of the fine particles is stopped by the diluting gas. Accordingly, it is possible to generate the fine particles even finer than the case where the method of manufacturing fine particles according to the first embodiment is used. Therefore, it is possible to obtain the fine particles in even sizes suitable for exerting the quantum effects, and the classification process is not required unlike the prior art. As a result, it is possible to improve raw material efficiency of the source gas and to reduce the manufacturing costs. Moreover, according to the second embodiment, the source gas is excited by plasma after the source gas passes through the gas-flow controlling plate 6c. Accordingly, there is no risk that through-holes on the gas-flow controlling plate 6c are clogged by the generated fine particles.

Third Embodiment

Figure 9:
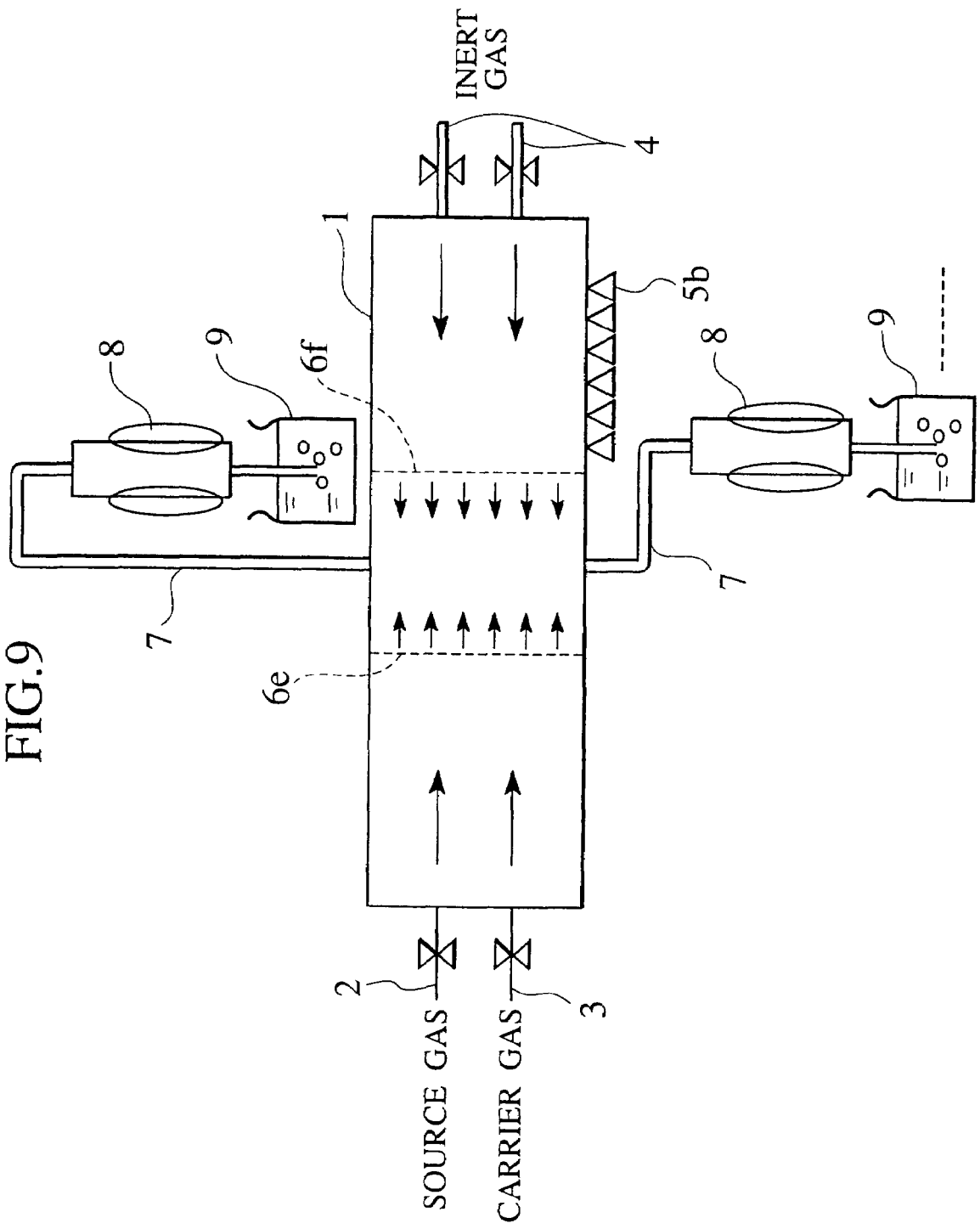
FIG. 9 is a view showing a constitution of an apparatus for manufacturing fine particles according to a third embodiment of the present invention.

FIG. 9 shows a constitutional view of an apparatus for manufacturing fine particles according to a third embodiment. The apparatus for manufacturing fine particles of the third embodiment also has a constitution substantially similar to the apparatus for manufacturing fine particles according to the first embodiment. However, a large difference is that a heater is not provided on a source gas inlet part side of a reactor 1 but a heater 5b is provided on a diluting gas inlet part side instead.

Specifically, the apparatus for manufacturing fine particles according to the third embodiment also includes a source gas inlet part 2 and a carrier gas inlet part 3 provided on one end of a reactor 1, and a diluting gas inlet part 4 provided on the other end counter-flow thereto. The apparatus also includes gas-flow controlling plates 6e and 6f severally provided in the middle of a flow channel of a reactive gas flow composed of the source gas and the carrier gas and in the middle of a diluting gas flow for equalizing flow rates of the reactive gas flow with respect to a cross section of the flow channel.

The heater 5b is disposed on an outside wall of the reactor 1 in a space between the diluting gas inlet part 4 and the gas-flow controlling plate 6f. Gas exhaust ports 7 are provided on a wall of the reactor in a region where the reactive gas flow and the diluting gas flow are merged. Pipes are provided so as to conduct discharged gas toward fine particle collectors 9 via cooling devices 8 for cooling the discharged gas containing fine particles.

Now, description will be made with reference to FIG. 9 regarding a method of manufacturing fine particles according to the third embodiment by use of the above-described apparatus for manufacturing fine particles. As similar to the first and the second embodiments, the method of manufacturing ZnS fine particles, which are usable as fluorescent materials, will be described as an example. The source gas, the carrier gas and the diluting gas for use in this embodiment are similar to those used in the first embodiment.

First, as similar to the first and the second embodiments, inert gas as the carrier gas is introduced into the reactor 1 from the carrier gas inlet part 3, and inert gas as the diluting gas is introduced into the reactor 1 from the diluting gas inlet part 4. These introduced gases constitute a gas flow toward the gas exhaust ports 7. This gas flow further flows to the cooling devices 8 and to the fine particle collector 9.

Next, the inert gas introduced from the diluting gas inlet part 4 is heated up to a temperature in a range from 600° C. to 700° C. and the gas pressure inside the reactor 1 is set to $9.33 \times 10^4$ Pa (700 torr). The temperature inside each of the cooling devices 8 is set to a room temperature and the pressure therein is set to the same pressure as the pressure inside the reactor.

Thereafter, the source gas containing $Zn(CH_3)_2$ gas and $H_2S$ gas is introduced from the source gas inlet part 2 into the reactor 1. The introduced source gas constitutes the reactive gas flow together with the carrier gas. The reactive gas flow passes through the gas-flow controlling plate 6e, whereby the reactive gas flow is adjusted to a gas flow with a flow rate being equalized with respect to a cross section of a flow channel. On the other hand, the diluting gas is introduced from the diluting gas inlet part 4 into the reactor and then heated up to the range from 600° C. to 700° C. with the heater 5b. The diluting gas thus heated is further adjusted to a gas flow with a flow rate being equalized with respect to the cross section of the flow channel by use of the gas-flow controlling plate 6f.

Thereafter, the reactive gas flow and the heated diluting gas flow are collided and merged. The source gas in the source gas flow is heated and excited by the heat in the diluting gas flow, whereby the source gas causes the following reaction as shown in the chemical formula (FII) as similar to the first embodiment and generates solid ZnS molecules.

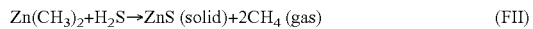

$Zn(CH_3)_2 + H_2S \rightarrow ZnS$ (solid) $+ 2CH_4$ (gas)  (FII)

Nevertheless, the generated ZnS fine particles are surrounded by the diluting gas simultaneously with generation. Therefore, generation of ZnS fine particle cores is immediately stopped. Accordingly, the growth of the fine particles is more surely stopped in the "fine particle core generating process" of the first stage (I) or in mid-course of the second stage (II). As a result, it is possible to suppress the growth of the fine particle sizes up to some 3 nm on the average.

Moreover, also in the third embodiment, since the reactive gas flow and the diluting gas flow are adjusted severally to have the equalized flow rates with respect to the cross section of the flow channel in the process of passing through the gas-flow controlling plates 6e and 6f, a time interval for the reactive gas flow to merge with the diluting gas flow is equalized irrespective of the location, whereby sizes of the obtained fine particles can be equalized. As a result, it is possible to uniform the sizes of the obtained fine particles.

The fine particles thus obtained are discharged from the gas exhaust ports 7 together with the reactive gas and the diluting gas. The discharged gas is cooled down to a room temperature with the cooling devices 8. Furthermore, the discharged gas is guided to a solution containing a surfactant filled in the fine particle collector 9. The ZnS fine particles are collected by the solution in the course of transmission through the solution and the rest of the discharged gas is discharged to the atmosphere.

In this way, the ZnS fine particles are preserved within the solution in the fine particle collector 9 in a dispersed state. When ZnS fine particles are necessary, the ZnS fine particles can be obtained by heating and drying the solution preserved in the fine particle collector 9.

As described above, in the case of using the method of manufacturing fine particles according to the third embodiment, the source gas is heated and excited in the merging region of the reactive gas flow and the diluting gas flow, whereby growth of the fine particles is initiated but stopped almost simultaneously due to the diluting gas. Accordingly, it is possible to generate the fine particles even finer than the case where the method of manufacturing fine particles according to the first embodiment is used. Therefore, it is possible to obtain the fine particles with uniform particles in nanometer sizes suitable for exerting the quantum effects, and the classification process is not required unlike the prior art. As a result, it is possible to improve raw material efficiency of the source gas and to reduce the manufacturing costs. Moreover, according to the third embodiment, the source gas is heated and excited after the source gas passes through the gas-flow controlling plate 6e. Accordingly, there is no risk that through-holes on the gas-flow controlling plate 6e are clogged by the generated fine particles.

Fourth Embodiment

Figure 10:
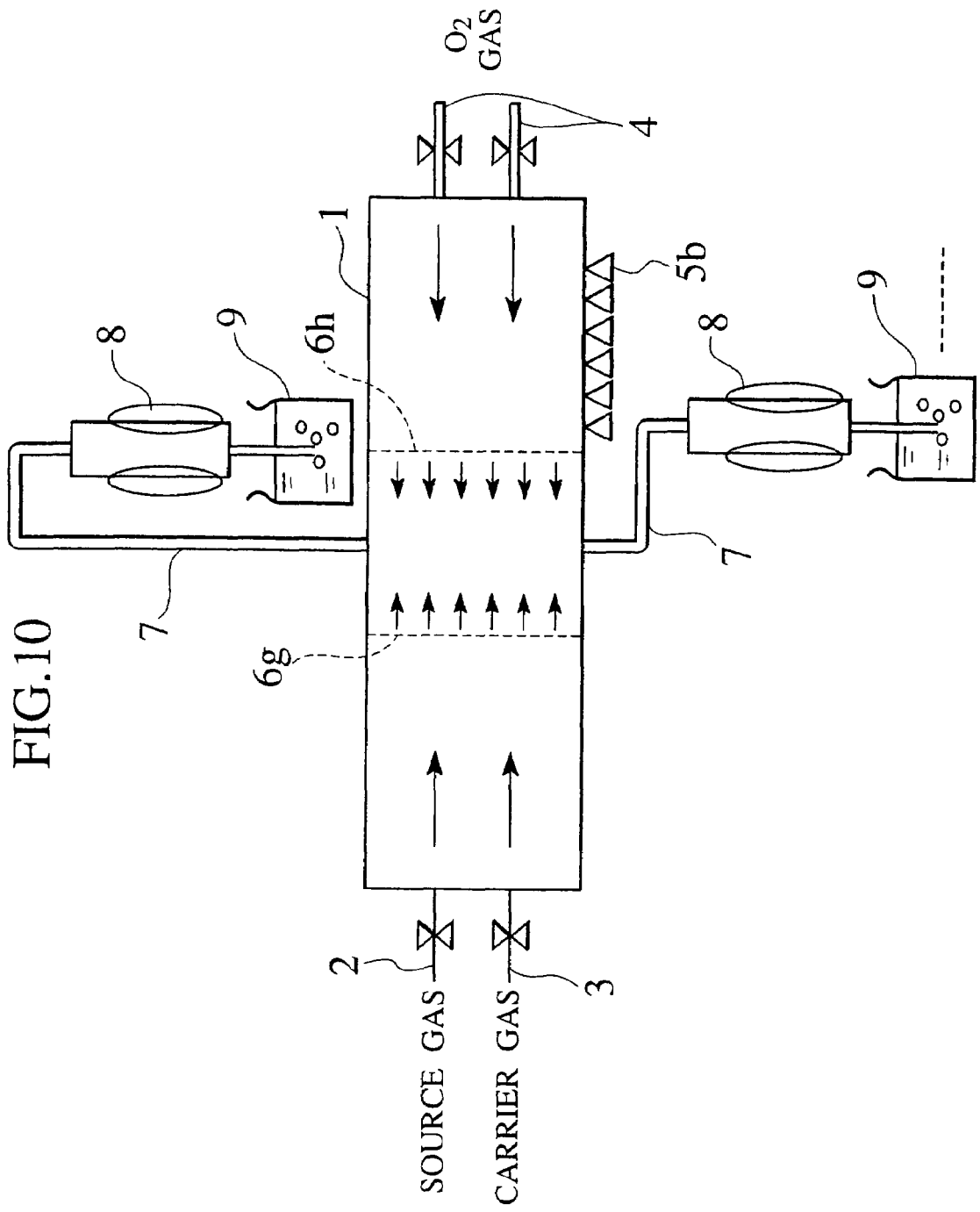
FIG. 10 is a view showing a constitution of an apparatus for manufacturing fine particles according to a fourth embodiment of the present invention.

A method of manufacturing fine particles according to a fourth embodiment is characterized in that oxygen-containing gas is used as diluting gas. In this method, generation of fine particle cores is promoted by an oxidation (burning) reaction of source gas. Accordingly, source gas exciting means such as a heater or a plasma generator is not required therein. Therefore, it is possible to use an apparatus as shown in FIG. 10, which is equivalent to the apparatus according to the first embodiment or the apparatus according to the third embodiment but the heater is removed therefrom.

Fine particles to be manufactured according to this method are mainly oxides, which include oxide fluorescent materials such as $Y_2O_5$, and powder for cosmetic use such as $TiO_2$. In the case of manufacturing $Y_2O_5$, the following method is applicable.

First, as similar to the first embodiment, inert gas as carrier gas is introduced into a reactor 1 from a carrier gas inlet part 3, and either oxygen gas or nitrogen gas mixed with oxygen gas as the diluting gas is introduced into the reactor 1 from a diluting gas inlet part 4. These introduced gases constitute a gas flow toward gas exhaust ports 7. Such a gas flow further flows to cooling devices 8 and to fine particle collectors 9.

Next, the gas pressure inside the reactor 1 is set to 1.013× $10^5$ Pa (760 torr) or less. Moreover, the temperature inside each of the cooling devices 8 is set to a room temperature and the pressure therein is set to almost the same pressure as the pressure inside the reactor 1.

Thereafter, yttrium acetylacetate ($Y(C_5H_7O_2)_3$) as the source gas is introduced from a source gas inlet part 2 into the reactor 1. The introduced source gas constitutes a reactive gas flow together with the carrier gas. The reactive gas flow passes through a gas-flow controlling plate 6g, whereby the reactive gas flow is adjusted to a gas flow with a flow rate being equalized with respect to a cross section of a flow channel. On the other hand, the diluting gas containing oxygen is introduced from the diluting gas inlet part 4 into the reactor 1 and then adjusted to a gas flow with a flow rate being equalized with respect to the cross section of the flow channel by use of a gas-flow controlling plate 6h.

In a merging region where the reactive gas flow and the diluting gas flow are merged, the source gas and oxygen causes a drastic oxidation (burning) reaction as expressed in the following formula (FIV), whereby $Y_2O_5$ fine particle cores are generated.

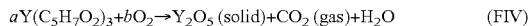

$$aY(C_5H_7O_2)_3 + bO_2 \rightarrow Y_2O_5 \text{ (solid)} + CO_2 \text{ (gas)} + H_2O \quad \text{(FIV)}$$

Meanwhile, the $Y_2O_5$ fine particles thus generated are surrounded by the diluting gas almost simultaneously with the oxidation (burning) reaction. Therefore, growth of the $Y_2O_5$ fine particle cores is stopped in that state. Accordingly, the growth of the fine particles is more surely stopped in the "fine particle core generating process" of the first stage (I) or in mid-course of the "fine particle cluster generating process" of the second stage (II). As a result, it is possible to suppress the growth of the fine particle sizes up to some 3 nm on the average.

Moreover, also in the fourth embodiment, since the reactive gas flow and the diluting gas flow are adjusted severally to have the equalized flow rates with respect to the cross section of the flow channel in the process of passing through the gas-flow controlling plates 6g and 6h, a time interval for the reactive gas flow to merge with the diluting gas flow is equalized irrespective of the location, whereby sizes of the obtained fine particles can be equalized. As a result, it is possible to uniform the sizes of the obtained fine particles.

The fine particles thus obtained are discharged from the gas exhaust ports 7 together with the reactive gas and the diluting gas. The discharged gas is cooled down to a room temperature with the cooling devices 8. Furthermore, the discharged gas is guided to a solution containing a surfactant filled in the fine particle collector 9, thus, the $Y_2O_5$ fine particles are collected by the solution in the course of transmission through the solution and the rest of the discharged gas is discharged to the atmosphere.

As described above, in the case of using the method of manufacturing fine particles according to the fourth embodiment, the source gas causes the oxidation (burning) reaction upon merging with the oxygen gas contained the diluting gas, whereby, the $Y_2O_5$ fine particle cores are generated. Moreover, the growth of the fine particles is stopped almost simultaneously due to the diluting gas. Accordingly, it is possible to generate the fine particles even finer than the case where the method of manufacturing fine particles according to the first embodiment is used. Since the fine particles with uniform particles in nanometer sizes can be obtained, the classification process is not required unlike the prior art. As a result, it is possible to improve raw material efficiency of the source gas and to reduce the manufacturing costs.

Moreover, according to the fourth embodiment, the source gas merges with the diluting gas containing oxygen after the source gas passes through the gas-flow controlling plate 6g. Accordingly, there is no risk that through-holes on the gas-flow controlling plate 6g are clogged by the generated fine particles. Furthermore, since the fourth embodiment does not require a heater or a plasma-generating power source or the like for exciting the source gas, it is possible to save the costs of the apparatus.

In the case of manufacturing $TiO_2$ fine particles by use of the manufacturing method of the fourth embodiment, titanium tetraisopropoxide, for example, may be used as the source gas and an oxidation (burning) reaction with oxygen may be promoted as follows:

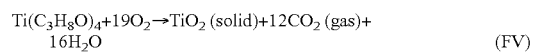

$$Ti(C_3H_8O)_4 + 19O_2 \rightarrow TiO_2 \text{ (solid)} + 12CO_2 \text{ (gas)} + 16H_2O \quad \text{(FV)}$$

The $TiO_2$ fine particles in the nanometer scale thus obtained have high specific surfaces. Accordingly, if the $TiO_2$ fine particles are used as materials for a solar battery, the fine particles can absorb energy of light efficiently. Therefore, it is possible to obtain a solar battery with high power generation efficiency.

Other Embodiments

In the above-described first to fourth embodiments, gaseous materials at normal temperatures are used for the fine particle source materials and introduced into the reactor as the source gas. However, the fine particle source materials are not limited to the gaseous materials, but liquid materials and solid materials are also applicable.

For example, when a liquid fine particle source material is used, the liquid fine particle source material may be atomized and introduced into the reactor. Alternatively, it is also possible to heat and vaporize a liquid or solid fine particle source material, so that the vaporized material is introduced into the reactor.

Furthermore, it is also possible to prepare a solution, in which a gas, liquid or solid fine particle source material is dissolved in a solvent, and to atomize the solution for introduction into the reactor. For example, if particle source material atomized and introduced is excited by heating with the apparatus according to the first embodiment, the fine particle source material inside the solution initiates a reaction to generate fine particles, simultaneously, the solvent around the particles is gradually evaporated and removed from the ZnS particles. While the fine particles are surrounded by the solvent, the fine particles are suppressed to be bonded or cohered together because the fine particles are prevented from contacting with one another by the solvent. As the growth of the fine particle sizes can be delayed accordingly, it is possible to form the sizes of the obtained particles even smaller.

Although the present invention has been described with reference to certain embodiments, it is needless to say that the present invention is not limited only to the above-described embodiments and various modifications or alterations are applicable without departing from the spirit and scope of the invention.

For example, regarding types of fine particles to be fabricated, various fine particles can be manufactured by use of a variety of source gas. For example, in addition to the ZnS as the fluorescent material, $Y_2O_5$ and $TiO_2$, it is also possible to fabricate various magnetic materials including metallic powder made of Co or Cr, ferrites, and the like. A recording medium using magnetic fine particles in the nanometer scale fabricated in accordance with the above-described methods can achieve substantially higher recording density.

Moreover, regarding the reactive apparatuses described in the respective embodiments, the mode of disposition of the reactor is not only limited to a horizontal direction but it is also possible to dispose the reactor in a vertical direction. Furthermore, the carrier gas or the diluting gas is not always limited to nitrogen, but other inert gas is also applicable.

As described above, according to the first aspect of the method of manufacturing fine particles of the present invention, the fine particles in the reactive gas flow are heated and then immediately stopped to grow inside the reactor by merger with the diluting gas introduced from the counter-flow direction. Therefore, it is possible to shorten the reactive time for generation of the fine particles and thereby to suppress the growth of the fine particles owing to cohesion. Moreover, the reactive gas flow and the diluting gas flow are severally adjusted to the flow rates equalized with respect to the cross section of the flow channel prior to merger. Accordingly, it is possible to equalize the mode of mixture of the two types of gas in terms of the cross section of the flow passage. As a result, it is also possible to equalize the time interval from initiation to termination of the fine particle generating reaction, which dominates the sizes of the fine particles. Accordingly, it is possible to obtain the fine particles, which are uniform in nanometer sizes.

According to the second aspect of the method of manufacturing fine particles of the present invention, the fine particle source materials are excited and generation of the fine particles is thereby promoted in the merging region of the reactive gas flow and the diluting gas flow, and the growth of the fine particles is stopped by dilution due to the diluting gas flow. Therefore, the growth of the fine particles is stopped immediately after initiation of the growth of the fine particles. Accordingly, it is possible to set the time for the growth of the fine particles to a very short time period. Therefore, it is possible to suppress increases in sizes of the fine particles due to bond or cohesion, whereby the fine particles in nanometer sizes can be generated.

According to the first aspect of the apparatus for manufacturing fine particles of the present invention, the apparatus can stop growth of the fine particles immediately after exciting the fine particle source materials contained in the reactive gas flow by means of merger with the diluting gas inside the reactor. Therefore, it is possible to shorten the time for the growth of the fine particles and to suppress increases in sizes of the fine particles due to cohesion. Moreover, the reactive gas flow and the diluting gas flow are merged together after the respective gas flows are set to the flow rates equalized with respect to the cross section of the flow channel by use of the first plate and the second plate severally provided with through-holes. Accordingly, it is possible to equalize a mixing condition of the reactive gas flow and the diluting gas flow in terms of the cross section of the flow channel. Therefore, the time period from start to end of the fine particle generating reaction is equalized, whereby the fine particles can be obtained in uniform sizes.

According to the second aspect of the apparatus for manufacturing fine particles of the present invention, the fine particle source materials are excited by plasma and generation of the fine particles is thereby promoted in the merging region of the reactive gas flow and the diluting gas flow, and the growth of the fine particles is stopped by dilution due to the diluting gas flow. Therefore, the virtual reactive time for generation of the fine particles can be substantially shortened. Accordingly, it is possible to suppress increases in sizes of the fine particles due to bonding or cohesion, whereby the fine particles within nanometer sizes can be obtained.

According to the third aspect of the apparatus for manufacturing fine particles of the present invention, the diluting gas flow is heated and then the fine particle source materials are heated in the merging region of the reactive gas flow and the diluting gas flow with the heat of the diluting gas, whereby the fine particle cores are generated and the growth of the fine particles is stopped almost simultaneously by dilution due to the diluting gas flow. Therefore, the reactive time for generation of the fine particles can be substantially shortened. Accordingly, it is possible to suppress increases in sizes of the fine particles due to bonding or cohesion, whereby the fine particles within nanometer sizes can be obtained.

The invention claimed is:

1. An apparatus for manufacturing fine particles, comprising:
    a cylindrical reactor having a first end and a second end opposite to the first end;
    a first inlet part including at least one port introducing a reactive gas flow containing a fine particle source material along an axial direction of the reactor, the first inlet part being provided on the first end of the reactor;
    a second inlet part including at least one port introducing a diluting gas flow along the axial direction of the reactor, the second inlet part being provided on the second end of the reactor approximately counter-flow to the first inlet part;
    a heater exciting the fine particle source material contained in the reactive gas flow;
    a first plate including through-holes which substantially equalize a flow rate of the reactive gas flow with respect to a cross section of a flow channel, the first plate being disposed inside the reactor almost perpendicularly with the axial direction of the reactor;
    a second plate facing to the first plate, including through-holes which substantially equalize a flow rate of the diluting gas flow with respect to a cross section of a flow channel, the second plate being disposed inside the reactor almost perpendicularly with respect to the axial direction of the reactor;
    a gas exhaust port provided in a merging region where the reactive gas flow passed through the first plate and the diluting gas flow passed through the second plate are merged; and
    a collector which collects fine particles contained in gas discharged from the gas exhaust port.

2. The apparatus of claim 1, wherein the first plate and the second plate have a plurality of through-holes and sizes thereof are set from 0.1 to 0.5 mm.

3. The apparatus of claim 1, wherein at least one of the first plate and the second plate is composed of a bundle of tubes.

4. The apparatus of claim 1, wherein the first plate and the second plate have a plurality of through-holes and sizes of a central portion of the through-holes are larger than sizes of a peripheral portion.

5. The apparatus of claim 1, wherein the collector includes a solution including a surfactant.

6. An apparatus for manufacturing fine particles comprising:
    a cylindrical reactor having a first end and a second end opposite to the first end;
    a first inlet part including at least one port introducing a reactive gas flow containing a fine particle source material along an axial direction of the reactor, the first inlet part being provided on the first end of the reactor;

a second inlet part including at least one port introducing a diluting gas flow along the axial direction of the reactor, the second inlet part being provided on the second end of the reactor approximately counter-flow to the first inlet part;

a plasma generator which generates plasma in a merging region where the reactive gas flow and the diluting gas flow are merged;

a gas exhaust port provided adjacently to the merging region;

a collector which collects fine particles contained in gas discharged from the gas exhaust port;

a first plate including through-holes which substantially equalize a flow rate of the reactive gas flow with respect to a cross section of a flow channel, the first plate being disposed inside the reactor almost perpendicularly with respect to the axial direction of the reactor; and a second plate facing to the first plate, including though-holes which substantially equalize a flow rate of the diluting gas flow with respect to a cross section of a flow channel, the second plate being disposed inside the reactor almost perpendicularly with respect to the axial direction of the reactor.

7. The apparatus of claim 6, wherein at least any one of the first plate and the second plate constitutes an electrode of a plasma generating source.

8. An apparatus for manufacturing fine particles comprising:

a cylindrical reactor having a first end and a second end opposite to the first end;

a first inlet part including at least one port introducing a reactive gas flow containing a fine particle source material along an axial direction of the reactor, the first inlet part being provided on the first end of the reactor;

a second inlet part including at least one port introducing a diluting gas flow along the axial direction of the reactor, the second inlet part being provided on the second end in the reactor approximately counter-flow to the first inlet part;

a heater which heats the diluting gas flow;

a gas exhaust port provided in a merging region where the reactive gas flow and the diluting gas flow are merged;

a collector which collects fine particles contained in gas discharged from the gas exhaust port;

a first plate including through-holes which substantially equalize a flow rate of the reactive gas flow with respect to a cross section of a flow channel, the first plate being disposed inside the reactor almost perpendicularly with respect to the axial direction of the reactor; and a second plate facing to the first plate, including through-holes which substantially equalize a flow rate of the diluting gas flow with respect to a cross section of a flow channel, the second plate being disposed inside the reactor almost perpendicularly with respect to the axial direction of the reactor.

* * * * *